(12) United States Patent
Wakabayashi

(10) Patent No.: US 9,140,198 B2
(45) Date of Patent: Sep. 22, 2015

(54) INTAKE AND EXHAUST APPARATUS OF MULTI-CYLINDER ENGINE

(71) Applicant: Mazda Motor Corporation, Aki-gun, Hiroshima (JP)

(72) Inventor: Yoshito Wakabayashi, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 487 days.

(21) Appl. No.: 13/721,762

(22) Filed: Dec. 20, 2012

(65) Prior Publication Data
US 2013/0199495 A1 Aug. 8, 2013

(30) Foreign Application Priority Data
Feb. 7, 2012 (JP) .................................. 2012-023976

(51) Int. Cl.
*F02D 13/02* (2006.01)
*F01N 13/00* (2010.01)

(52) U.S. Cl.
CPC ............ *F02D 13/0261* (2013.01); *Y02T 10/18* (2013.01)

(58) Field of Classification Search
CPC ....... F02D 13/02; F02D 9/04; F02D 13/0261; F01N 13/00; Y02T 10/18
See application file for complete search history.

(56) References Cited

U.S. PATENT DOCUMENTS

| | | | | |
|---|---|---|---|---|
| 6,968,825 B2 * | 11/2005 | Hitomi et al. | ............ | 123/406.11 |
| 8,256,402 B2 * | 9/2012 | Yamagata et al. | ......... | 123/559.1 |
| 2013/0074478 A1 * | 3/2013 | Yamaguchi | ..................... | 60/276 |

FOREIGN PATENT DOCUMENTS

JP 04036023 2/1992

* cited by examiner

*Primary Examiner* — Hieu T Vo
(74) *Attorney, Agent, or Firm* — Alleman Hall McCoy Russell & Tuttle LLP

(57) ABSTRACT

An intake and exhaust apparatus of a multi-cylinder engine is provided. The engine is provided with a plurality of cylinders having intake and exhaust valves for opening and closing intake and exhaust ports, respectively. The apparatus includes an intake system including intake ports of respective cylinders, independent intake passages connected with the respective intake ports, a surge tank connected with upstream ends of the independent intake passages, and an air cleaner connected with the surge tank. The apparatus also includes an exhaust system including independent exhaust passages connected with an exhaust port of one cylinder or exhaust ports of the plurality of cylinders that are not continuous in exhausting order, and a collecting pipe connected with downstream ends of the independent exhaust passages in a bundled manner, and for collecting exhaust gas ejected from the downstream ends of the independent exhaust passages.

4 Claims, 10 Drawing Sheets

INTAKE AND EXHAUST APPARATUS OF MULTI-CYLINDER ENGINE

BACKGROUND

The present invention relates to an intake and exhaust apparatus of a multi-cylinder engine installed in an automobile.

Conventionally, developments of intake and exhaust apparatuses of multi-cylinder engines installed in automobiles have been carried out for the purpose of increasing torque.

For example, JP1992-036023A (the fourth and fifth pages, and FIG. 3) discloses an art for preventing exhaust interference between cylinders by bundling exhaust passages of cylinders that are not continuous in exhausting order, assembling them to be a tapering exhaust pipe, and creating an ejector effect in the narrowed portions of the exhaust passages.

With multi-cylinder engines, in order to increase torque over a wide engine speed range to achieve a wide torque range, it is generally important to suppress the drop of a volumetric efficiency ($\eta V$) over engine speed ranges from a low engine speed range to a high engine speed range as much as possible. Thus, an engine that has no torque shock when accelerating, causes low discomfort, and is excellent in fuel consumption is provided.

SUMMARY

The present invention is made in view of the above situations and provides an intake and exhaust apparatus of a multi-cylinder engine suppressed in the drop of a volumetric efficiency over engine speed ranges.

According to one aspect of the invention, an intake and exhaust apparatus of a multi-cylinder engine is provided. The engine is provided with a plurality of cylinders having intake and exhaust valves for opening and closing intake and exhaust ports, respectively. The apparatus includes an intake system including intake ports of respective cylinders, independent intake passages connected with the respective intake ports, a surge tank connected with upstream ends of the independent intake passages, and an air cleaner connected with the surge tank. The apparatus also includes an exhaust system having independent exhaust passages connected with an exhaust port of one cylinder or exhaust ports of the plurality of cylinders that are not continuous in exhausting order, and a collecting pipe connected with downstream ends of the independent exhaust passages in a bundled manner, and for collecting exhaust gas ejected from the downstream ends of the independent exhaust passages. Within a low engine speed range where an engine speed is below a predetermined first engine speed, open periods of the intake and exhaust valves of each cylinder have a predetermined overlap period, and the overlap period of one of the cylinders that are continuous in exhausting order is set to overlap with an opening timing of the exhaust valve of the other cylinder. Both a pipe length and a pipe diameter of the intake system, or a volume of the intake system alone are set so that a synchronizing time point of intake air resonance in which a frequency of vibration caused by opening and closing the intake valve matches with a resonance frequency of the intake system is included within a middle engine speed range where the engine speed is between the first engine speed and a predetermined second engine speed higher than the first engine speed. A length of the independent intake passage is set so that an intake inertia effect based on a positive pressure wave is obtained within a high engine speed range where the engine speed is above the second engine speed, the positive pressure wave being obtained by the negative pressure wave of the intake air inverting in the surge tank, and the negative pressure wave being generated by opening the intake valve.

According to this aspect, the negative pressure is generated within the collecting pipe by the exhaust gas flowing into the collecting pipe through the independent exhaust passage, and by this negative pressure, an ejector effect is obtained in which the exhaust gas inside another independent exhaust passage or inside the exhaust port of the cylinder communicating to the other independent exhaust passage is sucked downstream.

Here, within the low engine speed range, the overlap period in which the exhaust valve and the intake valve of the same cylinder are both opened is provided, and the exhaust valve of one of the cylinders having the continuous exhausting order opens within the overlap period of the other cylinder. Therefore, the ejector effect spreads to the intake port of the cylinder during the overlap period, and scavenging of the cylinder is facilitated. In this manner, a volumetric efficiency ($\eta V$) is improved, and further, a torque is increased within the low engine speed range.

Additionally, according to this aspect, within the middle engine speed range, by adjusting the pipe length and the pipe diameter of the intake system or the volume of the intake system which is from the air cleaner to the intake ports, an intake resonance effect is obtained in which the frequency of the vibration caused by opening and closing the intake valve matches with the resonance frequency of the intake system. An intake air pressure vibration is produced by the intake resonance effect, and a forced induction of the intake air is performed by the intake air pressure vibration, and the volumetric efficiency is improved, and further, the torque is increased within the middle engine speed range.

Moreover, according to this aspect, within the high engine speed range, by adjusting the length of the independent intake passage, the intake inertial effect based on the positive pressure wave is obtained, the positive pressure wave being obtained by the negative pressure wave of the intake air inverting in the surge tank, and the negative pressure wave being generated by opening the intake valve.

As described above, the drop of the volumetric efficiency and, further, the drop of the torque are suppressed over the engine speed ranges from the low engine speed range to the high engine speed range. Thus, the multi-cylinder engine of this embodiment has no torque shock when accelerating, causes low discomfort, and is excellent in fuel consumption.

A volume of the air cleaner may be adjusted so that the synchronizing time point of the intake air resonance is included within the middle engine speed range.

According to this configuration, by adjusting the volume of the air cleaner, among the intake system, the volume of the intake system is adjusted and the intake resonance effect is obtained within the middle engine speed range. Therefore, the influence on the intake inertia effect within the high engine speed range due to the tuning to obtain the intake resonance effect can be suppressed. Specifically, in the case of adjusting in the intake system, for example, if the pipe length and the pipe diameter of the independent intake passage or the volume of the surge tank are adjusted, the synchronizing point of the intake inertia effect is changed, and therefore, a possibility arises that the intake inertia effect is not effectively exerted within an aimed engine speed range. In regard to this, it is preferable to adjust the volume of the air cleaner because it does not influence the intake inertia effect.

A distance from a seating position of the exhaust valve within the exhaust port of the cylinder to the downstream end of the independent exhaust passage may be set to 500 mm or shorter.

According to this configuration, because the distance from where the exhaust gas is discharged from the cylinder to where it flows into the collecting pipe is as relatively short as 500 mm or shorter, the flow rate of the exhaust gas when flowing into the collecting pipe becomes relatively high and the negative pressure generated within the collecting pipe becomes relatively high, and thus, the ejector effect is exerted more effectively.

According to the above aspect of the invention, a drop of the volumetric efficiency of the multi-cylinder engine is suppressed over the engine speed ranges from the low engine speed range to the high engine speed range. As a result, a multi-cylinder engine that is increased in torque over a wide engine speed range, obtains a flat torque characteristic, and has a wider torque range, can be obtained.

DETAILED DESCRIPTION OF EMBODIMENTS

(1) Overall Configuration

Figure 1:
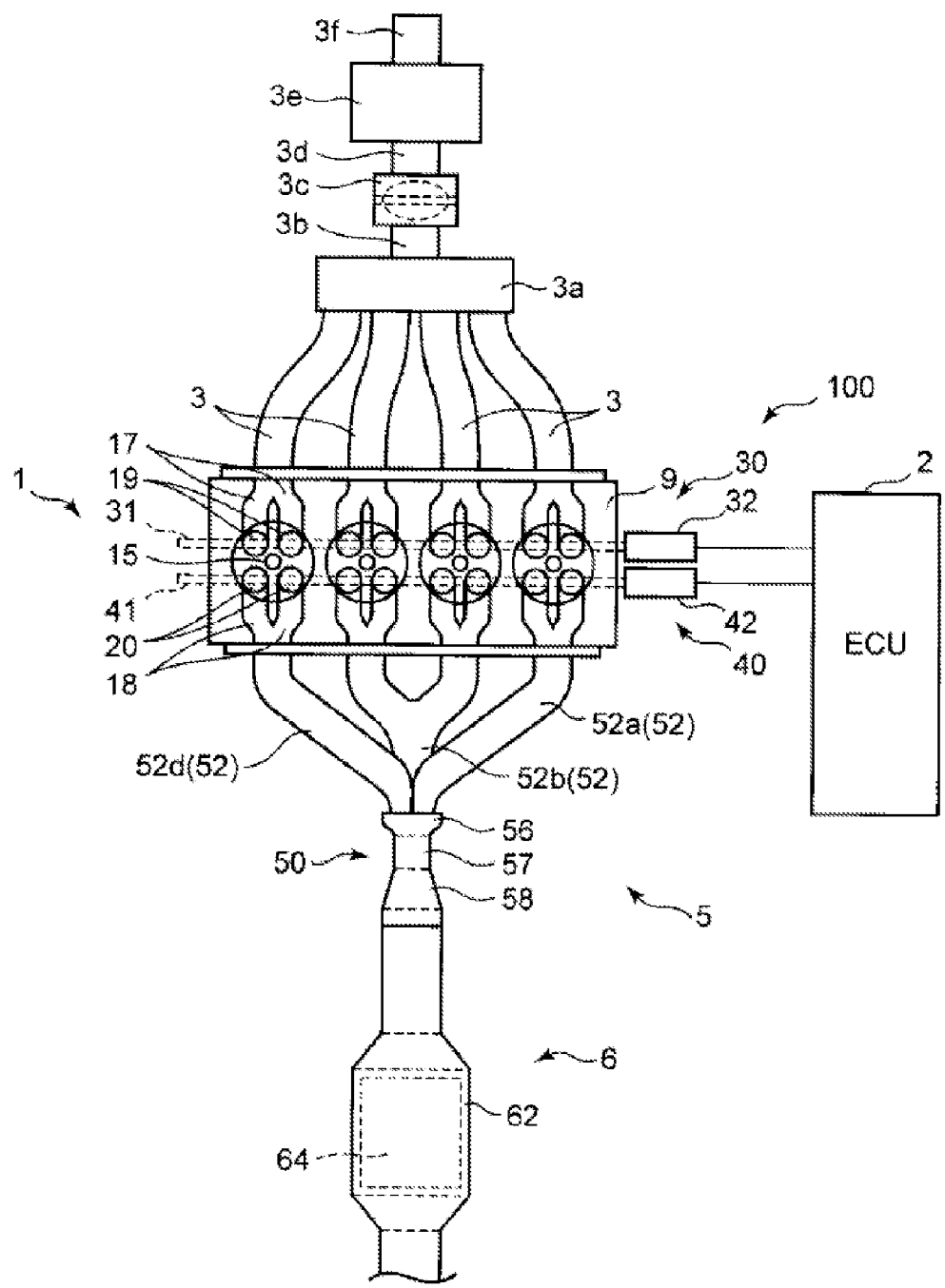
FIG. 1 is a schematic block diagram of an intake and exhaust apparatus of a multi-cylinder engine according to one embodiment of the present invention.
Figure 2:
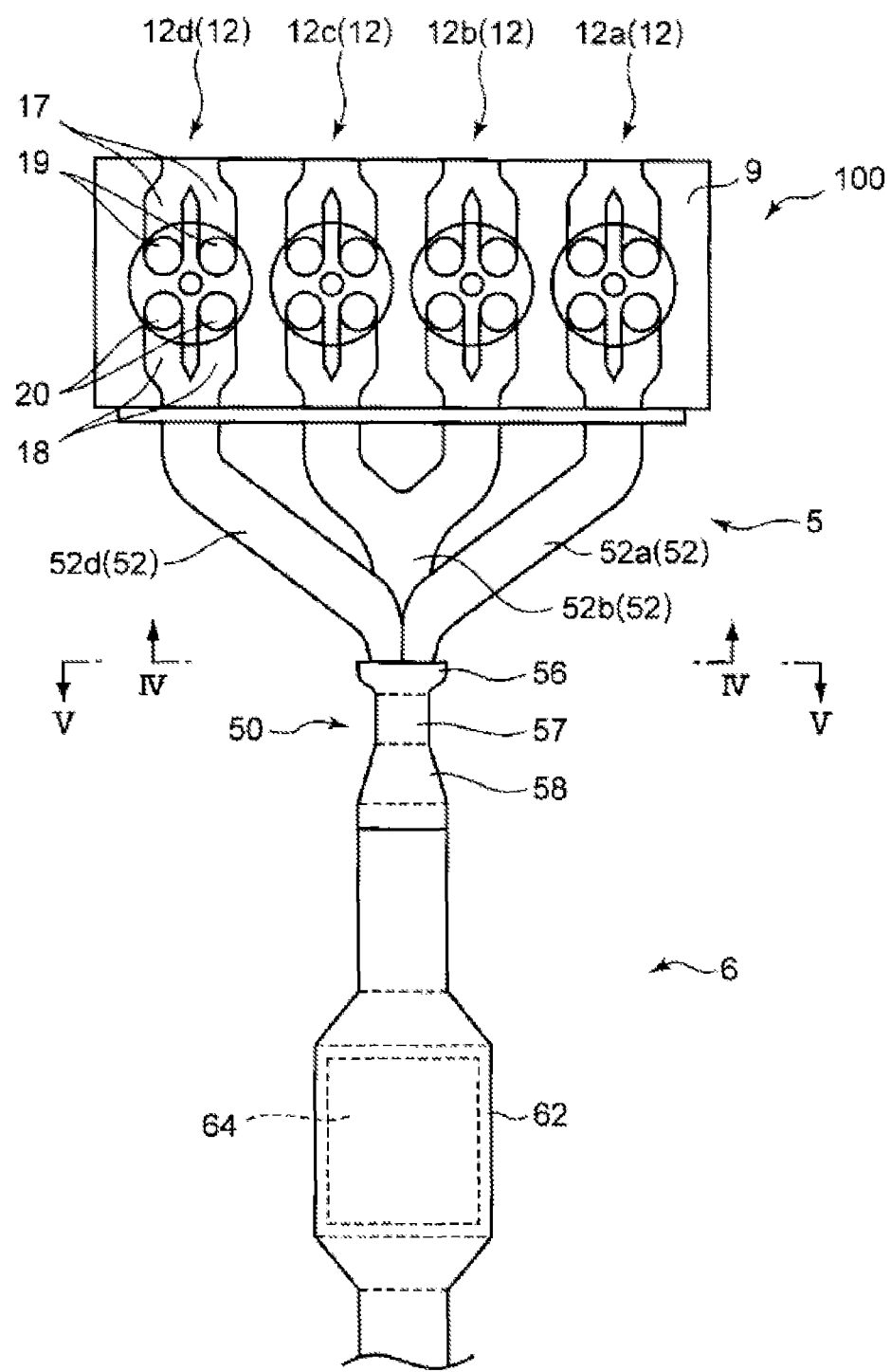
FIG. 2 is an enlarged view of an exhaust system in FIG. 1 without an intake system.
Figure 3:
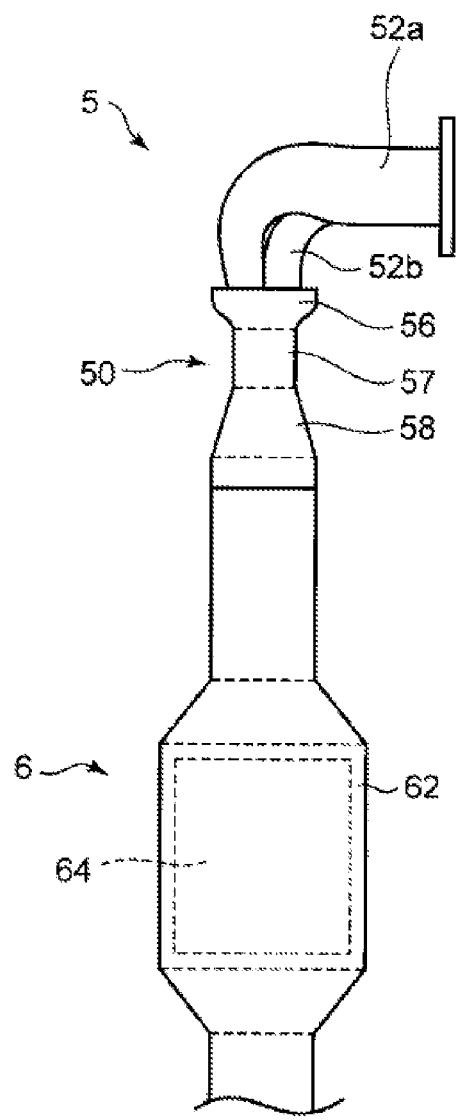
FIG. 3 is a side view of an essential part of FIG. 2.

FIG. 1 is a schematic block diagram of an intake and exhaust apparatus 100 of a multi-cylinder engine according to one embodiment of the present invention. FIG. 2 is an enlarged view of an exhaust system in FIG. 1 without an intake system. FIG. 3 is a side view of an essential part of FIG. 2. The intake and exhaust apparatus 100 includes an engine body 1 having a cylinder head 9 and a cylinder block (not illustrated), an engine control unit (ECU) 2 for engine control, the intake system formed with a plurality of independent intake passages 3 connected with the engine body 1, an exhaust manifold 5 connected with the engine body 1, and a catalyst device 6 connected with the exhaust manifold 5.

A plurality of cylinders 12 (four cylinders in the illustration) are formed in the cylinder head 9 and the cylinder block, and inserted with pistons therein, respectively. In this embodiment, the engine body 1 is an inline-four engine, and the four cylinders 12 are formed in line inside the cylinder head 9 and the cylinder block. Specifically, the cylinders are formed in the order of the first cylinder 12a, the second cylinder 12b, the third cylinder 12c, and the fourth cylinder 12d, from right to left in FIGS. 1 and 2. In the cylinder block 9, ignition plugs 15 are arranged to be exposed to combustion chambers partitioned above the pistons, respectively.

Figure 6:
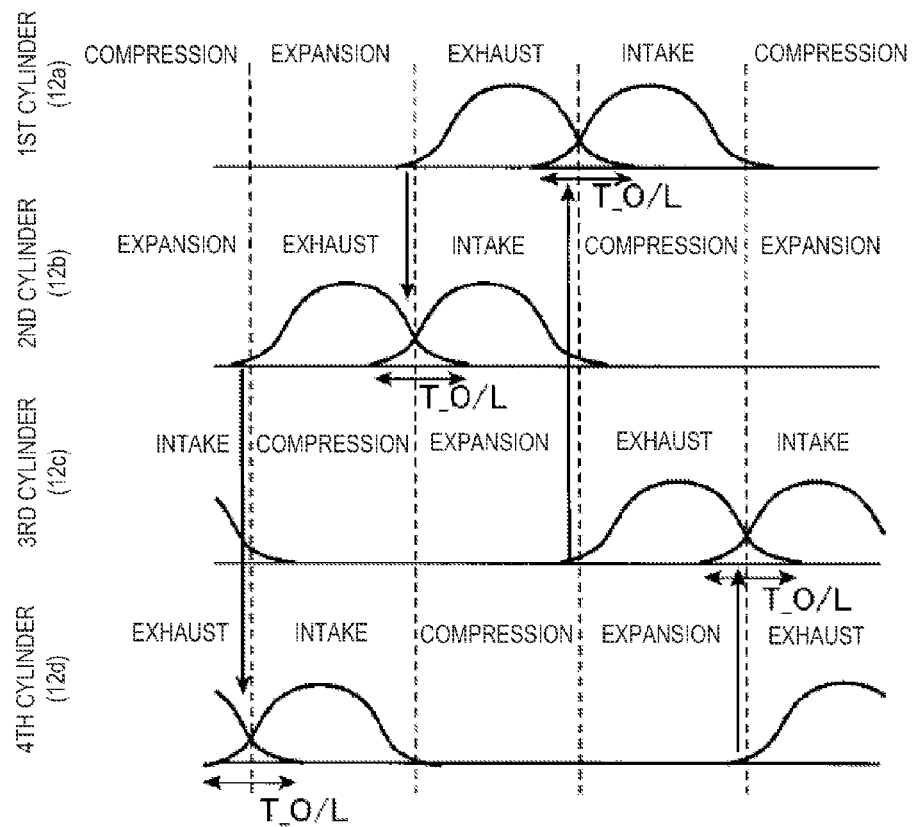
FIG. 6 illustrates charts showing that open periods of intake and exhaust valves of each cylinder of the engine have a predetermined overlap period.

The engine body 1 is a four stroke engine. As shown in FIG. 6, in the cylinders 12a to 12d, the ignition plugs 15 perform ignitions at timings different by 180° C.A, respectively, and thus, intake stroke, compression stroke, expansion stroke, and exhaust stroke are performed in the respective cylinders at timings different by 180° C.A. In this embodiment, the ignition is performed in the following order: the first cylinder 12a, the third cylinder 12c, the fourth cylinder 12d, and then the second cylinder 12b, and each stroke is executed in the same order.

The cylinder head 9 is formed with two intake ports 17 and two exhaust ports 18 for each combustion chamber, and each port opens toward the combustion chamber. The intake ports 17 introduce intake air into the cylinders 12, respectively. The exhaust ports 18 discharge exhaust gas from the cylinders 12, respectively. Each intake port 17 is provided with an intake valve 19 for opening and closing the intake port 17 to communicate and discommunicate the intake port 17 with inside the cylinder 12. Each exhaust port 18 is provided with an exhaust valve 20 for opening and closing the exhaust port 18 to communicate and discommunicate the exhaust port 18 with inside the cylinder 12. The intake valve 19 is driven by an intake valve drive mechanism 30 to open and close the intake port 17 at predetermined timings, respectively. The exhaust valve 20 is driven by an exhaust valve drive mechanism 40 to open and close the exhaust port 18 at predetermined timings, respectively.

The intake valve drive mechanism 30 has an intake camshaft 31 coupled to the intake valves 19, and an intake variable valve timing (VVT) 32. The exhaust valve drive mechanism 40 has an exhaust camshaft 41 coupled to the exhaust valves 20, and an exhaust VVT 42. The intake and exhaust camshafts 31 and 41 are coupled to a crankshaft via a well-known chain and a power transmission mechanism (e.g., sprocket mechanism), rotate corresponding to a rotation of the crankshaft, and open and close the intake and exhaust valves 19 and 20, respectively.

The intake and exhaust VVTs 32 and 42 change valve timings of the intake and exhaust valves 19 and 20, respectively. For example, the intake VVT 32 has a predetermined driven shaft coaxially arranged with the intake camshaft 31 and directly driven by the crankshaft, and changes a phase difference between the driven shaft and the intake camshaft 31. In this manner, the timing of the intake valve 19 is changed by changing the phase difference between the crankshaft and the intake camshaft 31. This is similar for the exhaust VVT 42.

Particular examples for the specific configuration of the intake and exhaust VVTs 32 and 42 include: a hydraulic mechanism formed with a plurality of liquid chambers aligned in a circumferential direction between the driven shaft and the intake camshaft 31 or the exhaust camshaft 41, and for changing the phase difference by creating a pressure difference among the liquid chambers; and an electromagnetic mechanism arranged with an electric magnet between the driven shaft and the intake camshaft 31 or the exhaust camshaft 41, and for changing the phase difference by applying a power to the electric magnet. The intake and exhaust VVTs 32 and 42 change the phase differences based on target valve timings of the intake and exhaust valves 19 and 20 which are calculated by the ECU 2, respectively.

In this embodiment, the intake and exhaust VVTs 32 and 42 change opening timings (corresponding to the opening start timing shown in FIG. 7) and closing timings of the intake and exhaust valves 19 and 20 while keeping open periods and lifts (i.e., valve profiles) of the intake and exhaust valves 19 and 20 stable, respectively.

Figure 7:
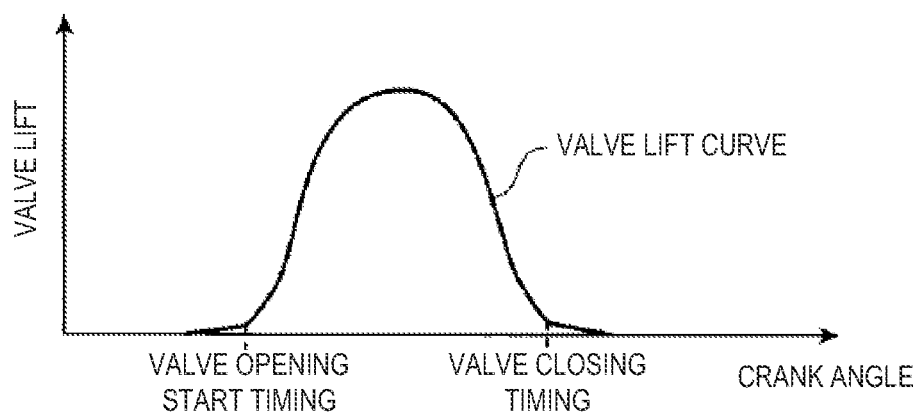
FIG. 7 is a chart illustrating the open periods of the intake and exhaust valves of the engine.

In this embodiment, the opening and closing timings of the intake and exhaust valves 19 and 20 mean, as shown in FIG. 7, the timing of the valve at which the lift of the valve rapidly rises or falls in a lift curve of the valve, for example, a timing with the lift of 0.4 mm.

(2) Configuration of Intake System

As shown in FIG. 1, the intake ports 17 of each cylinder 12 of the engine body 1 are connected with each of the independent passages 3. Upper ends of the independent passages 3 are connected with a surge tank 3a. The surge tank 3a is connected with an air cleaner 3e via a downstream common intake passage 3b and an upstream common intake passage 3d. A throttle body 3c accommodating a throttle valve is arranged between the two common intake passages 3b and 3d, and an air hose 3f serving as an air inlet is provided to the air cleaner 3e.

In this embodiment, as described later, a pipe length and a pipe diameter of the intake system or a volume of the intake system (from the air cleaner 3e to the intake ports 17) are adjusted to obtain, within a middle engine speed range, an intake resonance effect in which a frequency of vibration caused by opening and closing the intake valve 19 matches with a resonance frequency of the intake system.

Moreover, in this embodiment, as described later, a length of each independent intake passage 3 is adjusted to obtain, within a high engine speed range, an intake inertial effect based on a positive pressure wave obtained by a negative pressure wave of the intake air inverting in the surge tank 3a, the negative pressure wave being generated by opening the intake valve 19.

(3) Configuration of Exhaust System

As shown in FIGS. 1 to 3, the exhaust manifold 5 includes, from the upstream, three independent exhaust passages 52, and a collecting pipe 50 connected with downstream ends of the independent exhaust passages 52 and where the exhaust gas passed through the respective independent exhaust passages 52 flows in and gathers. The collecting pipe 50 has, on its axis from the upstream, a tapering part 56 of which a flow passage area is smaller toward the downstream, a straight part 57 extending downstream while maintaining the flow passage area stable at a downstream end of the tapering part 56 (the smallest flow passage area of the collecting pipe 50), and a diffuser part 58 of which a flow passage area is larger toward the downstream. In this embodiment, the tapering part 56 has an inverted trapezoid cone shape with smaller diameter toward the downstream, and the diffuser part 58 has a trapezoid cone shape with larger diameter toward the downstream.

Each independent exhaust passage 52 is connected with the exhaust ports 18 of each cylinder 12. Specifically, in this embodiment, among the four cylinders 12, the exhaust ports 18 of the first cylinder 12a are connected with a single independent exhaust passage 52a, and the exhaust ports 18 of the fourth cylinder 12d are connected with a single independent exhaust passage 52d. On the other hand, the exhaust ports 18 of the second and third cylinders 12b and 12c that are not continuous in exhausting order are connected with a common single independent exhaust passage 52b. More specifically, an upstream portion of the independent exhaust passage 52b connected with the exhaust ports 18 of the second and third cylinders 12b and 12c is divided into two passages, and one of the passages is connected with the exhaust ports 18 of the second cylinder 12b and the other passage is connected with the exhaust ports 18 of the third cylinder 12c.

In this embodiment, the independent exhaust passage 52b for the second and third cylinders 12b and 12c extends toward the tapering part 56 of the collecting pipe 50 at a position between the second and third cylinders 12b and 12c, in other words, at a position opposing to the center of the engine 1 in the cylinder aligned direction. On the other hand, the independent exhaust passage 52a for the first cylinder 12a and the independent exhaust passage 52d for the fourth cylinder 12d extend toward the tapering part 56 of the collecting pipe 50 while curving from positions opposing to the first and fourth cylinders 12a and 12d, respectively.

The independent exhaust passages 52a, 52b, and 52d are independent from each other, and the exhaust gas discharged from the first cylinder 12a, the exhaust gas discharged from the second cylinder 12b or the third cylinder 12c, and the exhaust gas discharged from the fourth cylinder 12d independently pass through the independent exhaust passages 52a, 52b, and 52d to the downstream, and is ejected into the tapering part 56 of the collecting pipe 50 from the downstream ends of the independent exhaust passages 52a, 52b, and 52d, respectively.

A downstream end portion of each independent exhaust passage 52 is a tapering portion with smaller flow passage area toward the downstream. In this manner, a flow rate of the exhaust gas when it is discharged from the downstream end of the independent exhaust passage 52 to the collecting pipe 50 is higher than a flow rate of the exhaust gas flow in the independent exhaust passage 52 to the tapering portion, and the exhaust gas is ejected into the tapering part 56 of the collecting pipe 50 from the downstream end of the independent exhaust passage 52 at high rate.

Figure 4:
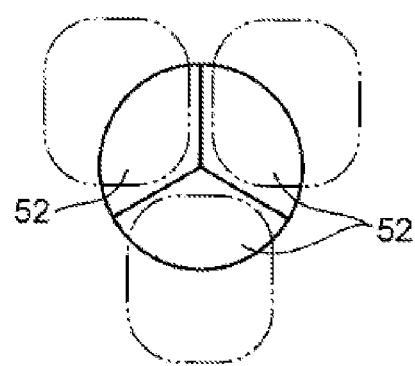
FIG. 4 is a cross-sectional view taken along a line IV-IV of FIG. 2.
Figure 5:
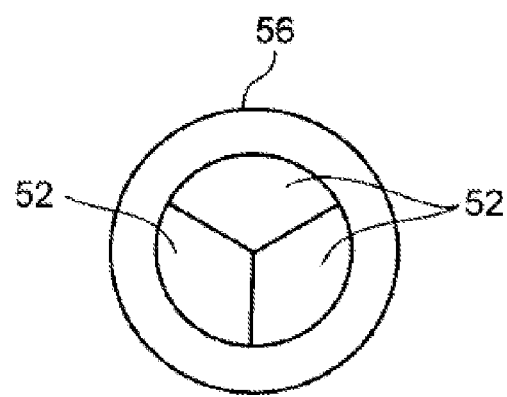
FIG. 5 is a cross-sectional view taken along a line V-V of FIG. 2.

In this embodiment, as shown in FIG. 4, each independent exhaust passage 52 has a smaller flow passage area toward the downstream from its upstream portion having a substantially elliptic cross-section (virtual line), and the downstream end of the independent exhaust passage 52 has a substantially pie-shaped cross-section having substantially one-third (⅓) of the flow passage area of the upstream part. Moreover, as shown in FIG. 5, the downstream end portions of the independent exhaust passages 52 are bundled so that the pie-shaped downstream ends gather to form a substantially circular cross-section as a whole, and they are connected with the upstream end of the tapering part 56 of the collecting pipe 50 (see FIGS. 1 to 3).

With such a configuration, when the exhaust gas passed through the independent exhaust passage 52 is ejected into the collecting pipe 50 at high rate, a negative pressure is generated within the collecting pipe 50, and by this negative pressure, an ejector effect is attained in which the exhaust gas inside another independent exhaust passage 52 adjacent to the independent exhaust passage from which the exhaust gas is discharged, or inside the exhaust ports 18 of the cylinder 12 communicating to the other independent exhaust passage 52 are sucked out to the downstream.

In order to improve the ejector effect, the tapering part 56 of the collecting pipe 50 is formed to have a smaller flow passage area toward the downstream. Thus, the exhaust gas ejected into the tapering part 56 from the downstream end of the independent exhaust passage 52 flows downstream through the tapering part 56 and the straight part 57 while maintaining the high flow rate, and therefore, the negative pressure generated within the collecting pipe 50 (especially from the tapering part 56 to the straight part 57) increases. In this embodiment, the flow passage area at the downstream end of the tapering part 56 (i.e., the smallest flow passage area of the collecting pipe 50, same as the flow passage area of the straight part 57) is set smaller than a total flow passage area of the downstream ends of the plurality of independent exhaust passages 52 so as to further increase the flow rate of the exhaust gas flowing through the tapering part 56 and the straight part 57 of the collecting pipe 50.

The exhaust gas ejected into the tapering part 56 from the downstream end of the independent exhaust passage 52 passes through the tapering part 56 and the straight part 57 at the high rate, and thus, the negative pressure generated from the tapering part 56 to the straight part 57 increases (i.e., the exhaust gas pressure decreases) and an exhaust gas temperature decreases. Therefore, a heat release amount of the exhaust gas to the outside can be suppressed in the tapering part 56 and the straight part 57. This affects advantageously in activating a catalyst (described later). Moreover, the exhaust gas passed through the straight part 57 flows into the diffuser part 58 having a larger flow passage area toward the downstream and, thus, the exhaust gas is reduced in its flow rate but the pressure and the temperature thereof recover, and it flows into the catalyst device 6 after returning back to the high-pressure and high-temperature state.

The catalyst device 6 purifies the exhaust gas discharged from the engine body 1. The catalyst device 6 includes a catalyst body 64 having a function of purifying the exhaust gas containing hazardous components, and a casing 62 for accommodating the catalyst body 64. The casing 62 has a substantially cylindrical shape extending in parallel to the flow direction of the exhaust gas. The catalyst body 64 contains, for example, a three-way catalyst, and has a three-way catalyst function that can remove HC (hydrocarbon), CO (carbon monoxide), NOx (nitrogen oxide) by oxidizing or reducing simultaneously under an atmosphere at a theoretical air fuel ratio.

The catalyst body 64 is accommodated in a wide diameter part in the center of the casing 62 in the exhaust gas flow direction. A predetermined space is formed in an upstream end of the casing 62. A downstream end of the diffuser part 58 of the collecting pipe 50 is connected with the upstream end of the casing 62. The exhaust gas discharged from the diffuser part 58 flows into the upstream end of the casing 62, and then moves on to the catalyst body 64. Here, as described above, the exhaust gas passed through the diffuser part 58 of the collecting pipe 50 is back to the high-pressure and high-temperature state. Therefore, the exhaust gas at a relatively high temperature flows into the catalyst body 64, and thus, the catalyst body 64 is activated rapidly, and a well-activated state of the catalyst body 64 is maintained.

(4) Characteristics of this Embodiment

Figure 8:
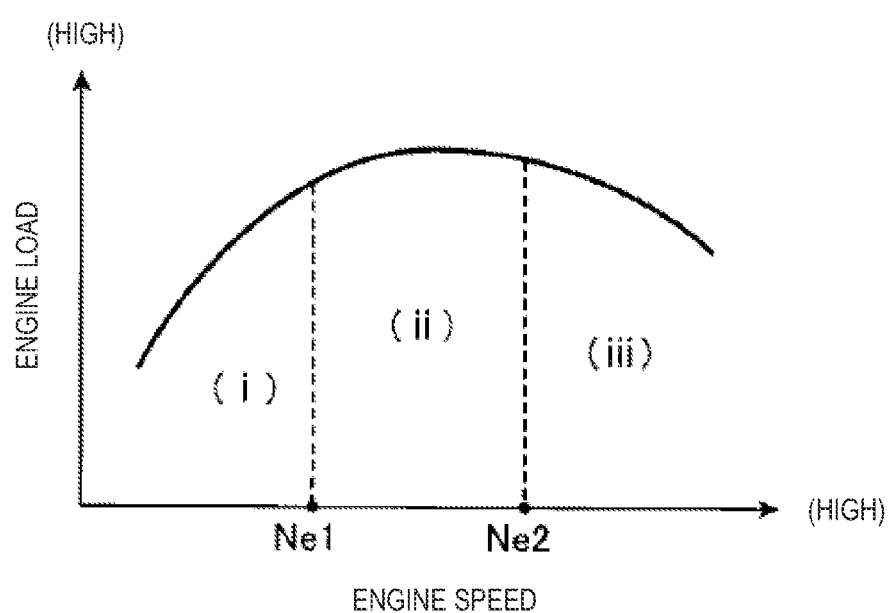
FIG. 8 is a chart illustrating engine speed ranges.

In this embodiment, as shown in FIG. 8, an operation range where an engine speed is below a predetermined first engine speed Ne1 is set as a low engine speed range (i), an operation range where the engine speed is between the first engine speed Ne1 and a predetermined second engine speed Ne2 higher than the first engine speed Ne1 is set as a middle engine speed range (ii), and an operation range where the engine speed is above the second engine speed Ne2 is set as a high engine speed range (iii).

For example, the first engine speed Ne1 is between 2700 and 2800 rpm, and the second engine speed Ne2 is between 3800 and 4000 rpm.

[4-1] Ejector Effect within Low Engine Speed Range

The ECU 2 controls the intake and exhaust VVTs 32 and 42 of the intake and exhaust valve drive mechanisms 30 and 40 so that at least within the low engine speed range (i), open periods of the intake and exhaust valves of each cylinder 12 have a predetermined overlap period and the overlap period of one of cylinders 12 that are continuous in exhausting order overlaps with the exhaust valve opening timing of the other cylinder 12.

Further specifically, within the low engine speed range (i), as shown in FIG. 6, the intake and exhaust VVTs 32 and 42 are controlled so that the open period of each exhaust valve 20 of the cylinder 12 overlaps with the open period of each intake valve 19 over an intake top dead center (intake TDC), and during an overlap period T_O/L of one of cylinders 12 that are continuous in exhausting order (the preceding cylinder), the exhaust valve 20 of the other cylinder 12 (the following cylinder) starts to open. For example, the intake and exhaust VVTs 32 and 42 are controlled by the ECU 2 so that the exhaust valve 20 of the third cylinder 12c opens within the period in which the exhaust valve 20 and the intake valve 19 of the first cylinder 12a overlap, the exhaust valve 20 of the fourth cylinder 12d opens within the period in which the exhaust valve 20 and the intake valve 19 of the third cylinder 12c overlap, the exhaust valve 20 of the second cylinder 12b open within the period in which the exhaust valve 20 and the intake valve 19 of the fourth cylinder 12d overlap, and the exhaust valve 20 of the first cylinder 12a opens within the period in which the exhaust valve 20 and the intake valve 19 of the second cylinder 12b overlap.

In this manner, due to that the exhaust valve 20 of the cylinder 12 on the exhaust stroke (exhaust stroke cylinder) is opened and blowdown gas is ejected from the exhaust stroke cylinder 12 into the tapering part 56 of the collecting pipe 50 at a high rate through the independent exhaust passage 52, the negative pressure is generated within the exhaust port 18 of the exhaust stroke cylinder 12 during the overlap period T_O/L by the ejector effect. Therefore, the ejector effect spreads not only to the exhaust port 18 of the cylinder 12 on the intake stroke (intake stroke cylinder) during the overlap period T_O/L, but also to the intake port 17 of the intake stroke cylinder 12, and thus, the scavenging of the intake stroke cylinder 12 during the overlap period T_O/L is facilitated.

Figure 9:
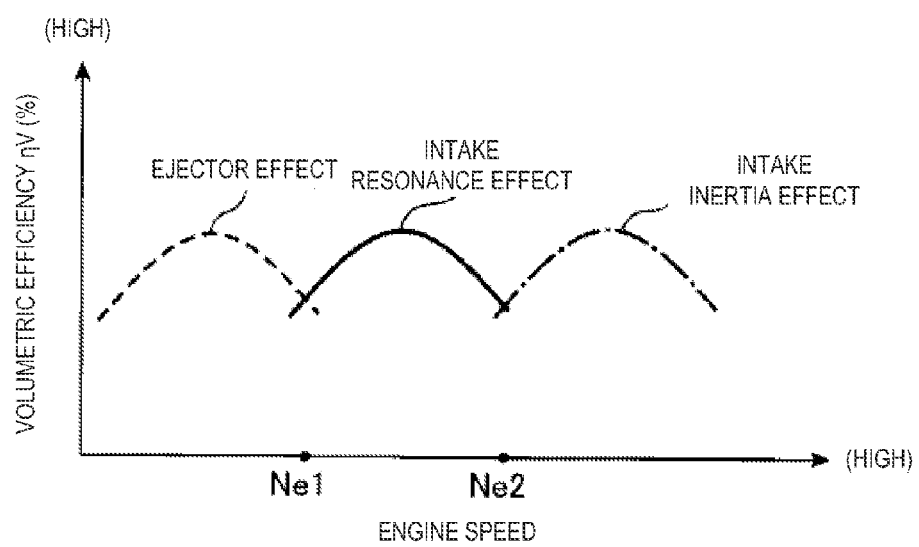
FIG. 9 is a chart illustrating an operation (a relation between each engine speed range and a volumetric efficiency) of this embodiment.

As a result, as indicated by the broken line in FIG. 9, as least within the low engine speed range (i), the multi-cylinder engine of this embodiment can be improved in volumetric efficiency (ηV) and, further, increased in torque by the ejector effect.

In this embodiment, a distance from a seating position of the exhaust valve 20 within the exhaust port 18 of the cylinder 12 to the downstream end of the independent exhaust passage 52 is set to 500 mm or shorter. In this manner, because the distance from where the exhaust gas is discharged from the cylinder 12 to where it flows into the collecting pipe 50 is as relatively short as 500 mm or shorter, the flow rate of the exhaust gas when flowing into the collecting pipe 50 becomes relatively high and the negative pressure generated within the collecting pipe 50 becomes relatively high, and thus, the ejector effect is exerted more effectively.

[4-2] Intake Resonance Effect within Middle Engine Speed Range

Next, within the middle engine speed range (ii), the pipe length and the pipe diameter of the intake system or the volume of the intake system are adjusted so that a forced induction of the intake air is performed by the intake resonance effect. Specifically, the intake resonance effect is a phenomenon in which the frequency of the vibration caused by opening and closing the intake valve 19 matches with the resonance frequency of the intake system and produces intake air pressure vibration, and the forced induction of the intake air is performed by the intake air pressure vibration.

Therefore, by matching with (synchronizing) the resonance frequency of the intake system with the opening-and-closing cycle of the intake valve 19 of the engine, the intake resonance effect can be obtained within an aimed engine speed range. In this embodiment, the pipe length and the pipe diameter of the intake system or the volume of the intake system are set so that a synchronizing time point of the intake air resonance in which the vibration frequency generated by opening and closing the intake valve 19 matches with the resonance frequency of the intake system which is from the air cleaner 3e to the intake ports 17 appears (is included) within the middle engine speed range where the engine speed is between the first speed Ne1 and the second speed Ne2. In this manner, the forced induction of the intake air is performed within the middle engine speed range by the intake air pressure vibration caused by the intake resonance effect.

As a result, as indicated by the solid line in FIG. 9, within the middle engine speed range (ii), the multi-cylinder engine of this embodiment can be improved in volumetric efficiency and, further, increased in torque by the intake resonance effect.

In this embodiment, the intake system includes, from the engine body 1 side, the intake ports 17, the independent intake passages 3, the surge tank 3a, the downstream common intake passage 3b, the throttle body 3c, the upstream common intake passage 3d, and the air cleaner 3e. Therefore, the pipe length and the pipe diameter of the intake system or the volume of the intake system mean a total pipe length and a total pipe diameter of the parts or a total volume of the parts. Here, the air cleaner 3e may have an air hose 3f. In this case, the pipe length and the pipe diameter of the intake system or the volume of the intake system include a pipe length and a pipe diameter of the air hose 3f or the volume of the air hose 3f.

In this embodiment, the volume of the air cleaner 3e is reduced to relatively small so as to reduce the volume of the overall intake system. In this manner, the resonance frequency of the intake system synchronizes with the opening-and-closing cycle of the intake valve 19 within the middle engine speed range (ii). By reducing the volume of the air cleaner 3e, the following secondary effects can be obtained other than that the intake resonance effect within the middle engine speed range (ii) is attained: a layout of the other components within the engine room becomes easier; and a gap with a bonnet for protecting pedestrians can be secured.

To adjust the volume of the intake system, the following methods are applicable other than the increasing/reducing adjustment of the volume of the air cleaner 3e: an increasing/reducing adjustment of the volume of the surge tank 3a; an increasing/reducing adjustment of the pipe lengths and the pipe diameters of the common intake passages (throttle necks) 3b and 3d; an increasing/reducing adjustment of the pipe length and the pipe diameter of the air hose 3f; an increasing/reducing adjustment of the pipe length and the pipe diameter of each independent intake passage 3; and an increasing/reducing adjustment of the volume of each intake port 17. Further, it is also effective to provide a resonator in a position closer to the engine body 1 than the air cleaner 3e. However, because the volume of the surge tank 3a and the pipe lengths and the pipe diameters of the independent intake passage 3 and the intake port 17 influence the intake inertia effect within the high engine speed range (iii) (described next), when these values are tuned in view of the intake resonance effect, a synchronizing time point of the intake inertia effect is changed, and there arises a possibility that the intake inertia effect cannot be exerted effectively within the aimed high engine speed range (iii). In this regard, the increasing/reducing adjustment of the volume of the air cleaner 3e is preferable because it does not influence the intake inertial effect within the high engine speed range (iii).

[4-3] Intake Inertia Effect within High Engine Speed Range

Next, within the high engine speed range (iii), the length of each independent intake passage 3 is adjusted so that the forced induction of the intake air is performed by the intake inertia effect. Specifically, the intake inertia effect is a phenomenon in which the positive pressure wave is obtained by the negative pressure wave of the intake air inverting in the surge tank 3a, and the forced induction of the intake air is performed by the positive pressure wave reaching the intake port 17 while the intake valve is opened, the negative pressure wave being generated by opening the intake valve 19.

Therefore, by matching (synchronizing) the length from the intake ports 17 to the independent intake passage 3 with the opening-and-closing cycle of the intake valve 19 of the engine, the intake inertia effect can be obtained within the aimed engine speed range. In this embodiment, the length of independent intake passage 3 is set so that the intake inertial effect based on the positive pressure wave obtained by the negative pressure wave of the intake air, which is generated by opening the intake valve 19, inverting in the surge tank 3a can be obtained within the high engine speed range where the engine speed is above the second speed Ne2. In this manner, the positive pressure wave generated in the intake inertia effect reaches the intake port 17 while the intake valve 19 is opened, and the forced induction of the intake air is performed within the high engine speed range.

As a result, as indicated by the chain line in FIG. 9, within the high engine speed range (iii), the multi-cylinder engine of this embodiment can be improved in volumetric efficiency and, further, increased in torque by the intake inertia effect.

As described above, the drop of the volumetric efficiency and, further, the drop of the torque are suppressed over the engine speed ranges from the low engine speed range (i) to the high engine speed range (iii). Thus, the multi-cylinder engine of this embodiment has no torque shock when accelerating, causes low discomfort, and is excellent in fuel consumption.

[4-4] Operations

Generally, with multi-cylinder engines having an exhaust system structure with which an ejector effect cannot be attained, an improvement in volumetric efficiency within a low engine speed range is attempted by, for example, an intake resonance effect, and an improvement in volumetric efficiency within a high engine speed range is attempted by, for example, an intake inertia effect.

On the other hand, with the multi-cylinder engine of this embodiment, because the exhaust system has the structure with which the ejector effect can be attained, the volumetric efficiency within the low engine speed range can be improved by the ejector effect. Here, within the low engine speed range, however, the ejector effect and the intake resonance effect cooperate, and when the both effects are exerted, the volumetric efficiency is excessively improved, a large difference is generated with the volumetric efficiency of the middle engine speed range, and it causes the torque shock and discomfort.

Thus, in this embodiment, the volumetric efficiency is improved by the ejector effect within the low engine speed range, the intake resonance effect by the middle engine speed range, and the intake inertia effect by the high engine speed range, respectively. Therefore, there is no engine speed range where the volumetric efficiency is excessively high or low, the change of the volumetric efficiency is smoothened over the wide engine speed range from the low engine speed range to the high engine speed range, and a wide torque range is achieved.

[4-5] Demonstration Test

As a demonstration test, with the intake and exhaust apparatus 100 of the multi-cylinder engine shown in FIG. 1, the change of the volumetric efficiency is checked for cases where the volume of the surge tank 3*a* is fixed to 2 L, the engine speed is between 1000 and 6000 rpm, and the volume of the air cleaner 3*e* is 7 L (black diamond mark in FIG. 10), 5 L (black triangle mark in FIG. 10), and 2 L (black circle mark in FIG. 10), respectively. The results are shown in FIG. 10.

Figure 10:
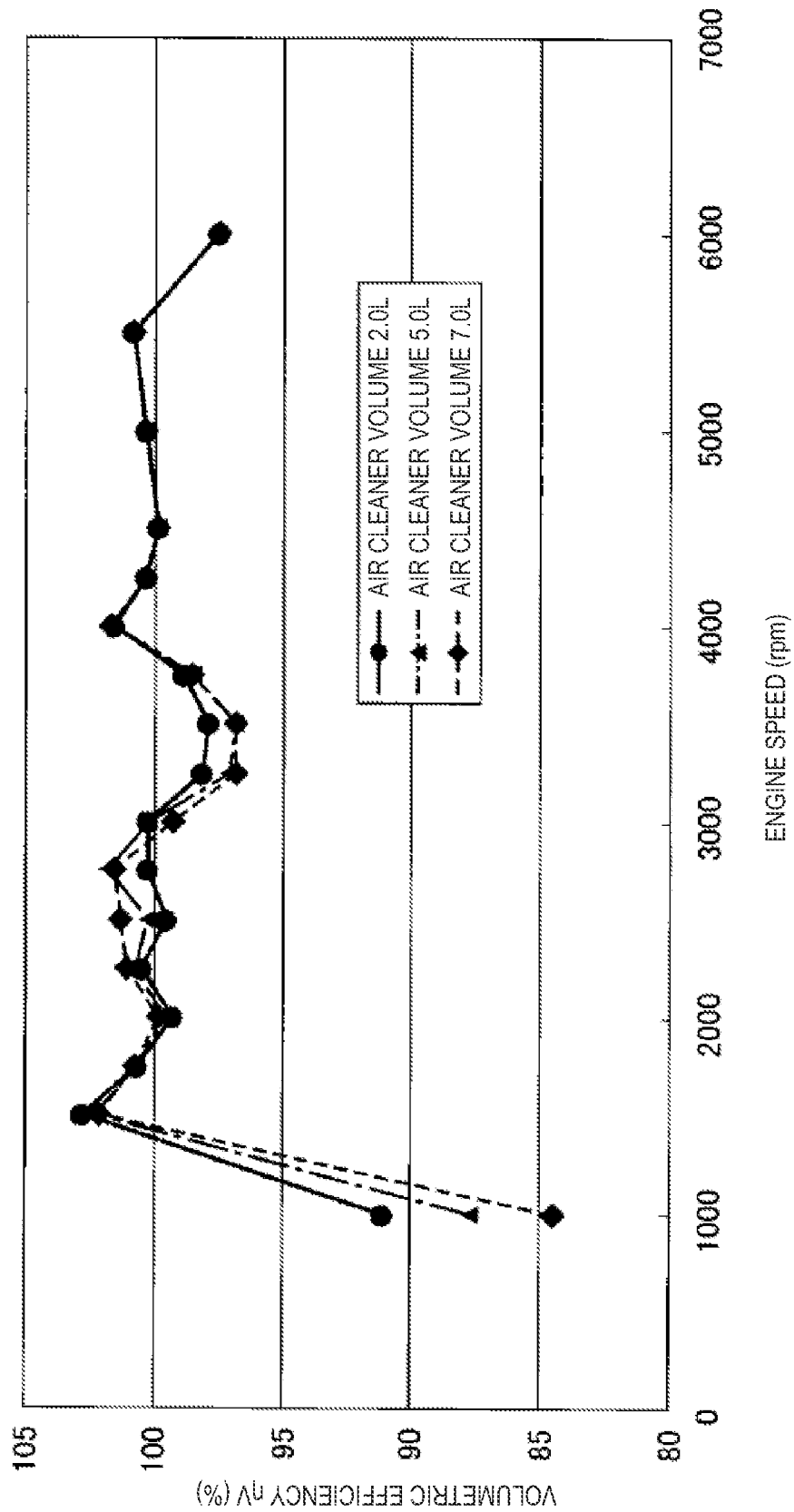
FIG. 10 is a chart illustrating an operation (an intake resonance effect within a middle engine speed range) of this embodiment.

As it is clear from FIG. 10, as the volume of the air cleaner 3*e* is reduced, within the engine speed range between 3000 and 3700 rpm (middle engine speed range), the volumetric efficiency improved and came close to 100%. On the other hand, within the engine speed range between 2500 and 2700 rpm (low engine speed range), the volumetric efficiency dropped but did not fall below 100% significantly. Moreover, within the engine speed range between 4000 and 5500 rpm (high engine speed range), regardless of the volume of the air cleaner 3*e*, the volumetric efficiency remained above 100%. Furthermore, also within the engine speed range between 1400 and 2200 rpm (low engine speed range), regardless of the volume of the air cleaner 3*e*, the volumetric efficiency remained near or above 100%.

Thus, firstly, it is considered that within the engine speed range between 1400 and 2700 rpm (low engine speed range), the improved state of the volumetric efficiency is maintained by the ejector effect without being influenced by the volume change of the air cleaner 3*e*. Moreover, it is considered that also within the engine speed range between 4000 and 5500 rpm (high engine speed range), the improved state of the volumetric efficiency is maintained by the intake inertia effect without being influenced by the volume change of the air cleaner 3*e*.

On the other hand, regarding the intake resonance effect, when the volume of the air cleaner 3*e* is 7 L, the volume of the exhaust system became relatively large and it is considered that the engine speed synchronizing with the resonance frequency of the intake system appeared within the engine speed range as relatively low as between 2500 and 2700 rpm. In other words, the improvement of the volumetric efficiency by the intake resonance effect did not occur within the aimed engine speed range between 3000 and 3700 rpm but occurred within the lower engine speed range between 2500 and 2700 rpm. In this case, the drop of the volumetric efficiency is seen within the engine speed range between 3000 and 3700 rpm, and the excessive improvement of the volumetric efficiency by the ejector effect and the intake resonance effect is seen within the engine speed range between 2500 and 2700 rpm. As a result, the volumetric efficiency varies between the engine speed range between 2500 and 2700 rpm and the engine speed range between 3000 and 3700 rpm, and therefore, causing increases in torque shock and discomfort when accelerating and when climbing on an uphill. Moreover, when shifting from the engine speed range between 2500 and 2700 rpm to the engine speed range between 3000 and 3700 rpm, because the torque drops, a driver generally depresses an accelerator greatly, and causes the fuel consumption degradation.

On the other hand, when the volume of the air cleaner 3*e* is 2 L, the volume of the intake system becomes relatively small and it is considered that the engine speed synchronizing with the resonance frequency of the intake system shifted toward a higher frequency and appeared within the aimed engine speed range between 3000 and 3700 rpm. As a result, the volumetric efficiency improved within the engine speed range between 3000 and 3700 rpm where the volumetric efficiency dropped between the improvement of the volumetric efficiency by the ejector effect and the improvement of the volumetric efficiency by the intake inertia effect in the case with the volume of 7 L, and the volumetric efficiency dropped within the engine speed range between 2500 and 2700 rpm where the volumetric excessively improved by the ejector effect and the intake resonance effect in the case with the volume of 7 L. As a whole, the change of the volumetric efficiencies is smoothened over the wide engine speed range from the low engine speed range to high engine speed range, and the wide torque range is achieved. As a result, a multi-cylinder engine that has low torque shock and discomfort when accelerating and climbing on an uphill, and is excellent in fuel consumption is realized.

(5) Modifications of this Embodiment

The collecting pipe 50 may only have the tapering part 56 with the narrowing flow passage area (no straight part 57 and diffuser part 58), or may only have the straight part 57 and the diffuser part 58 with the widening flow passage area (no tapering part 56). Also by using the collecting pipe 50 with such a configuration, the ejector effect can sufficiently be obtained. For example, in a case of shortening the collecting pipe 50 in product design because of, for example, restrictions of layouts, the collecting pipe 50 may only have the tapering part 56 or may have a shape that directly connects the tapering part 56 with the diffuser part 58 by a smooth curvy surface, without the straight part 57.

Additionally, the providing of the overlap period T_O/L between the intake valve 19 and the exhaust valve 20 and the control of overlapping the overlap period T_O/L of one of the cylinders 12 that are continuous in exhausting order with the exhaust valve opening timing of the other cylinder 12 may be performed within a relatively high load range of the low engine speed range (i).

DESCRIPTION OF REFERENCE NUMERALS

3 Independent Intake Passage
3*a* Surge Tank
3*b* Downstream Common Intake Passage
3*c* Throttle Body
3*d* Upstream Common Intake Passage
3*e* Air Cleaner
3*f* Air Hose
12 Cylinder
17 Intake Port
18 Exhaust Port
19 Intake Valve
20 Exhaust Valve
30 Intake Valve Drive Mechanism
32 Intake VVT
40 Exhaust Valve Drive Mechanism
42 Exhaust VVT
50 Collecting Pipe
52 Independent Exhaust Passage
56 Tapering Part
100 Intake and Exhaust Apparatus Ne1 First Engine Speed
Ne2 Second Engine Speed
i Low Engine Speed Range
ii Middle Engine Speed Range
iii High Engine Speed Range

The invention claimed is:

1. An intake and exhaust apparatus of a multi-cylinder engine provided with a plurality of cylinders having intake and exhaust valves for opening and closing intake and exhaust ports, respectively, the apparatus comprising:
   an intake system including intake ports of respective cylinders, independent intake passages connected with respective intake ports, a surge tank connected with upstream ends of the independent intake passages, and an air cleaner connected with the surge tank; and
   an exhaust system including independent exhaust passages connected with an exhaust port of one cylinder or exhaust ports of the plurality of cylinders that are not continuous in exhausting order, and a collecting pipe connected with downstream ends of the independent exhaust passages in a bundled manner, and for collecting exhaust gas ejected from the downstream ends of the independent exhaust passages,
   wherein, within a low engine speed range where an engine speed is below a predetermined first engine speed, open periods of the intake and exhaust valves of each cylinder have a predetermined overlap period, and the overlap period of the open period of the intake valve of one of the cylinders is set to overlap with an opening timing of the exhaust valve of another cylinder that is continuous in exhausting order,
   wherein both a pipe length and a pipe diameter of the intake system, or a volume of the intake system alone are set so that a synchronizing time point of intake air resonance in which a frequency of vibration caused by opening and closing the intake valve matches with a resonance frequency of the intake system is included within a middle engine speed range where the engine speed is between the first engine speed and a predetermined second engine speed higher than the first engine speed, and
   wherein a length of the independent intake passage is set so that an intake inertia effect based on a positive pressure wave is obtained within a high engine speed range where the engine speed is above the second engine speed, the positive pressure wave being obtained by a negative pressure wave of the intake air inverting in the surge tank, and the negative pressure wave being generated by opening the intake valve.

2. The apparatus of claim 1, wherein a volume of the air cleaner is adjusted so that the synchronizing time point of the intake air resonance is included within the middle engine speed range.

3. The apparatus of claim 2, wherein a distance from a seating position of the exhaust valve within the exhaust port of the cylinder to the downstream end of the independent exhaust passage is set to 500 mm or shorter.

4. The apparatus of claim 1, wherein a distance from a seating position of the exhaust valve within the exhaust port of the cylinder to the downstream end of the independent exhaust passage is set to 500 mm or shorter.

* * * * *